Dec. 3, 1929.　　　B. F. CONNER ET AL　　　1,737,643
MEDICAL TABLET CONTAINER

Filed March 17, 1927

Inventors
Benjamin F. Conner
William F. Schmalz
By S. Jay Teller
Attorney

Patented Dec. 3, 1929

1,737,643

UNITED STATES PATENT OFFICE

BENJAMIN F. CONNER, OF HARTFORD, AND WILLIAM F. SCHMALZ, OF ROCKVILLE, CONNECTICUT, ASSIGNORS TO COLT'S PATENT FIRE ARMS MANUFACTURING COMPANY, OF HARTFORD, CONNECTICUT, A CORPORATION OF CONNECTICUT

MEDICAL-TABLET CONTAINER

Application filed March 17, 1927. Serial No. 176,230.

The object of the invention is to provide a container, particularly adapted for medical tablets, which may be of such size as to adapt it to be conveniently carried in the pocket of the user, which is so constructed as to permit one or two tablets to be easily removed without in any way disturbing the others, which presents a pleasing and attractive appearance, and which has other advantages.

In accordance with the foregoing object we have provided an improved medical tablet container having certain novel mechanical and structural features as will be described in detail.

In the accompanying drawing we have shown two embodiments of the invention but it will be understood that the drawing is intended for illustrative purposes only and is not to be construed as limiting or defining the scope of the invention, the claims forming a part of this specification being relied upon for that purpose.

Of the drawing:

Fig. 8 is a transverse sectional view taken along the line 8—8 of Fig. 6.

Figure 1:
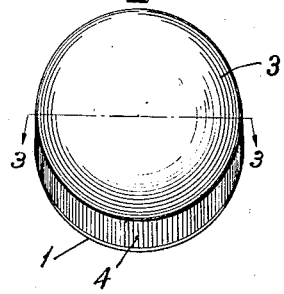
Figure 1 is a perspective view of a container embodying the invention.
Figure 2:
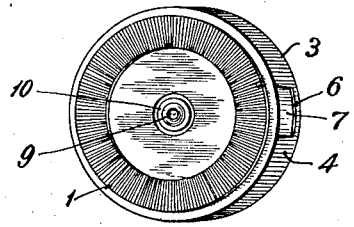
Fig. 2 is another perspective view of the container turned on its side so as to show the bottom.
Figure 3:
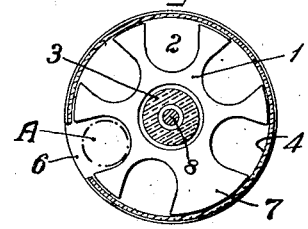
Fig. 3 is a central sectional view taken along the line 3—3 of Fig. 1.

In the drawings we have illustrated the invention as embodied in a container having the two major parts thereof formed of molded material such as a phenolic condensation compound. It will be understood, however, that while the invention is particularly applicable to a container made of molded material it is not necessarily so limited. As concerns some of the broader features of the invention the container may be made of metal as, for instance, sheet metal.

Referring particularly to Figs. 1 to 5, 1 represents the body of the container, this body being in the form of a disc or cylinder. It is shown as being made in one piece, but it may be otherwise made particularly if constructed from sheet metal. Formed in the body are recesses 2 each adapted to contain at least one of the tablets or other articles for which the container is adapted. As illustrated, each recess is adapted to contain two tablets as shown at A, A, but as to this we do not limit ourselves. The several recesses 2, 2 are arranged at equal distances from the axis of the body and each of them is closed at the bottom so that the bottom of the body is imperforate as clearly shown in Fig. 2. Each of the recesses is open at at least one side and as shown each of them is open at two sides, that is, at the top and at the periphery of the body.

The container is provided with a cover 3 which is pivotally connected with the body so as to be rotatable about the axis thereof. This cover is adapted to close the open side or sides of each of the recesses 2 and when the said recesses are open at the periphery as shown the cover is provided with an annular skirt 4 which surrounds and substantially fits the periphery of the body. As illustrated the body is provided with an annular flange or ledge 5 which preferably projects outward beyond the skirt to provide an improved appearance at the joint.

Figure 4:
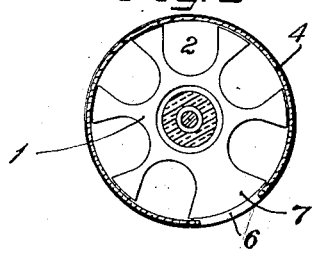
Fig. 4 is a transverse sectional view taken along the line 4—4 of Fig. 3.

Formed in the cover is an opening which is adapted to register with an open side of any one of the recesses so as to permit the removal through the said opening of one of the tablets or other articles from its recess. When the recesses are open at the periphery as shown and as preferred the said opening in the cover is formed in the skirt thereof as shown at 6. It will be seen that when the opening is opposite a recess as shown in Fig. 4 the article or articles in the recess can be easily removed through the opening. It will also be observed that each of the other recesses 2 is closed by the skirt so that the articles therein are not only held in place but are protected.

Figure 5:
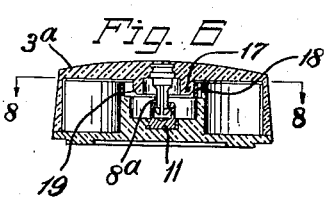
Fig. 5 is a view similar to Fig. 4 but showing the cover in a different position.

Preferably the several recesses in the body are not uniformly spaced but are so spaced as to leave an unrecessed portion of the body between two of them, this portion having a width at least approximating the width of each recess. When the recesses are open at the periphery as shown and as preferred the said recessed portion is at the periphery as shown at 7. The width of the unrecessed portion 7 is such that it entirely closes the said opening 6 when the opening is brought opposite the portion 7 as shown in Fig. 5. With the parts in the relative positions shown in this figure all of the recesses are closed and the articles therein are protected and at the same time the container presents a pleasing appearance, the finished surface of the portion 7 serving to neatly close the opening 6 as clearly shown in Fig. 2.

As concerns the details of the pivotal connecting means between the body and the cover there may be considerable variation. One suitable means is clearly shown in Fig. 3. As shown in this figure there is a pintle element 8 which is embedded in the material of the cover and which projects downward through a bearing opening in the body. This element is preferably molded in place. The lower end of the pintle is riveted over as shown at 9 and if desired a washer 10 may be interposed between the body and the riveted end portion of the pintle. It will be observed that the upper end portion of the pintle is entirely surrounded by the material of the cover so that the top of the cover has a smooth uninterrupted surface.

Figure 6:
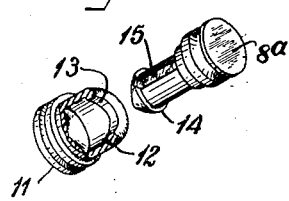
Fig. 6 is a view similar to Fig. 3 but showing an alternate embodiment of the invention.
Figure 7:
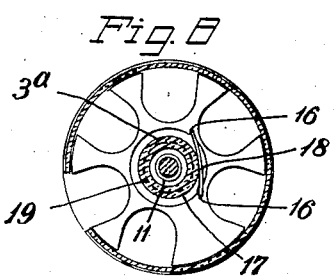
Fig. 7 is an enlarged perspective view of the pivot elements showing Fig. 6.

In Figs. 6 to 8 we have shown an alternate form of pivotal connecting means. As shown in this figure there is a pintle element 8ª which is connected with the cover 3ª in the manner already described. There is also provided a socket bearing member 11 which is similarly connected with the body, being molded in place so that the material of the body entirely surrounds the lower end portion thereof. The lower surface of the body is thus smooth and entirely uninterrupted by the pivotal connecting means. The two elements 8ª and 11 are so formed that they are adapted to be snapped into engagement with each other and so that after being so snapped into engagement they cannot be separated. As illustrated the element 11 is formed with an undercut recess 12 therein having an inward facing lip 13 as shown most clearly in Fig. 7. The pintle element 8ª is formed with an annular flange or rib 14 which is adapted to fit within the recess 12 and engage the lip 13. In order that the two elements may be assembled, one of them, preferably the element 8ª, is split or slotted as shown at 15. The slot 15 permits the two parts of the pintle at opposite sides thereof to spring together thus enabling the flanged portion 14 to pass the lip 13 and enter the recess 12. The end of the pintle element 8ª is preferably tapered to facilitate assembly. After the pintle has been entered in the recess the said side portions are returned to their normal positions and the rib 14 by its engagement with the lip 13 prevents the subsequent separation of the parts. From the foregoing description it will be apparent that the body and the cover can be molded separately with their respective pivot elements 8ª and 11 molded in place and that the two parts can be permanently assembled by the simple procedure of snapping the two pivot elements together as already described.

It may be desirable to provide means other than the pivot elements themselves for providing a frictional resistance to relative rotative movement between the body and the cover. When the container is being carried in a pocket of the user the cover should ordinarily be in the position shown in Fig. 5, and without some means providing resistance to rotation the parts might gradually work away from this relative position exposing one of the recesses and permitting one or more of the contained tablets to fall out. In order to avoid this we preferably provide a spring carried by one of the parts and engaging the other for the purpose of frictionally resisting relative movement. The details of the spring and the manner of mounting thereof may be widely varied but in Figs. 6 and 8 we have shown one form of spring and a mounting therefor which is satisfactory. As illustrated the body is formed with a central recess 16 and the cover is formed with a hub 17 which projects into the recess but is nevertheless somewhat smaller. A flat spring 18 is provided which is seated in notches formed in the outer wall of the recess 16 and which engages the periphery of the hub 17. In order to facilitate assembly the inner end of the hub 17 is preferably bevelled as shown at 19. It will be apparent that upon assembly the bevelled portion 19 will engage the spring 18 and bend it outward thus permitting the parts to be moved into their operative positions without difficulty. After assembly the spring continues to bear against the cylindrical portion of the hub 17 thus frictionally resisting relative rotative movement between the body and the cover.

What we claim is:

1. In a container for medical tablets and similar articles, the combination of a cylindrical body member having a plurality of separate similar recesses therein each closed at the bottom and open at the top and at the periphery and each adapted to contain at least one of the said articles, the said recesses being spaced to leave an unrecessed portion of the periphery having a width at least approximating the width of each of the recesses, a cover positioned to close all of the said body recesses at the tops thereof, means pivotally connecting the cover with the body for movement about the axis of the latter, and an annular skirt formed integrally with the cover and surrounding and substantially fitting the periphery of the body, the said skirt having an opening therein adapted to be brought into peripheral register with any one of the said recesses or with the unrecessed portion of the periphery and the said opening being of such size as to permit the removal therethrough of one of the said articles from its recess while the other recesses are closed by the skirt and of such size as to be adapted to be entirely closed by the said unrecessed portion of the body periphery.

2. In a container for medical tablets and similar articles, the combination of a cylindrical body having a plurality of separate recesses therein each closed at the bottom and each adapted to contain at least one of the said articles, a top cover pivotally movable about the axis of the body and including an annular skirt surrounding and substantially fitting the periphery of the body, the said cover having an opening therein adapted to be brought into register with any one of the said recesses and of sufficient size to permit the removal of one of the said articles from its recess and the said cover serving when the opening is in register with one recess to close all of the other recesses, and a pivotal connecting means for the body and cover including a downward projecting device imbedded in the cover and having its upper end portion entirely surrounded by the material thereof.

3. In a container for medical tablets and similar articles, the combination of a cylindrical body having a plurality of separate recesses therein each closed at the bottom and each adapted to contain at least one of the said articles, a top cover pivotally movable about the axis of the body and including an annular skirt surrounding and substantially fitting the periphery of the body, the said cover having an opening therein adapted to be brought into register with any one of the said recesses and of sufficient size to permit the removal of one of the said articles from its recess and the said cover serving when the opening is in register with one recess to close all of the other recesses, and a pivotal connecting means for the body and cover including a downward projecting element imbedded in the cover and having its upper end portion entirely surrounded by the material thereof and also including an upward projecting element imbedded in the body and having its lower end portion entirely surrounded by the material thereof.

4. In a container for medical tablets and similar articles, the combination of a cylindrical body having a plurality of separate recesses therein each closed at the bottom and each adapted to contain at least one of the said articles, a top cover pivotally movable about the axis of the body and including an annular skirt surrounding and substantially fitting the periphery of the body, the said cover having an opening therein adapted to be brought into register with any one of the said recesses and of sufficient size to permit the removal of one of the said articles from its recess and the said cover serving when the opening is in register with one recess to close all of the other recesses, and a pivotal connecting means for the body and cover including a downward projecting element imbedded in the cover and having its upper end portion entirely surrounded by the material thereof and also including an upward projecting element imbedded in the body and having its lower end portion entirely surrounded by the material thereof, the said elements being formed for inter-engagement with each other to permit rotation while preventing separation and one of the elements being split to permit it to yieldably engage the other.

5. In a container for medical tablets and similar articles, the combination of a cylindrical body having a plurality of separate recesses therein each closed at the bottom and each adapted to contain at least one of the said articles, a top cover pivotally movable about the axis of the body and including an annular skirt surrounding and substantially fitting the periphery of the body, the said cover having an opening therein adapted to be brought into register with any one of the said recesses and of sufficient size to permit the removal of one of the said articles from its recess and the said cover serving when the opening is in register with one recess to close all of the other recesses, a pivotal connecting means for the body and cover, and a spring carried by one of the last said parts and engaging the other to frictionally resist relative rotative movement.

6. In a container for medical tablets and similar articles, the combination of a cylindrical body member having a plurality of separate similar recesses therein each closed at the bottom and open at the periphery and each adapted to contain at least one of the said articles, the said recesses being spaced to leave an unrecessed portion of the periphery having a width at least approximating the width of each of the recesses, a cover pivotally connected with the body for movement about the axis thereof and having an annular skirt surrounding and substantially fitting the periphery of the body, the said skirt having an opening therein adapted to be brought into register with any one of the said recesses or with the unrecessed portion of the periphery and the said opening being of such size as to permit the removal therethrough of one of the said articles from its recess while the other recesses are closed by the skirt and of such size as to be adapted to be entirely closed by the said unrecessed portion of the body periphery, a pivotal connecting means for the body and cover inincluding a downward projecting element imbedded in the cover and having its upper end portion entirely surrounded by the material thereof and also including an upward projecting element imbedded in the body and having its lower end portion entirely surrounded by the material thereof, the said elements being formed for interengagement with each other to permit rotation while preventing separation and one of the elements being split to permit it to yieldably engage the other, and a spring interposed between the body and the cover, the spring being carried by one of the last said parts and frictionally engaging the other to resist relative rotative movement.

BENJAMIN F. CONNER.
WILLIAM F. SCHMALZ.